May 12, 1970   J. F. WENCKUS ET AL   3,511,614
HEAT SENSITIVE FUEL CONTROLLED VERNEUIL PROCESS
Filed June 16, 1967   6 Sheets-Sheet 1

INVENTOR.
Joseph F. Wenckus
Paul R. Doherty
BY
Attorney

INVENTOR.
Joseph F. Wenckus
BY Paul R. Doherty

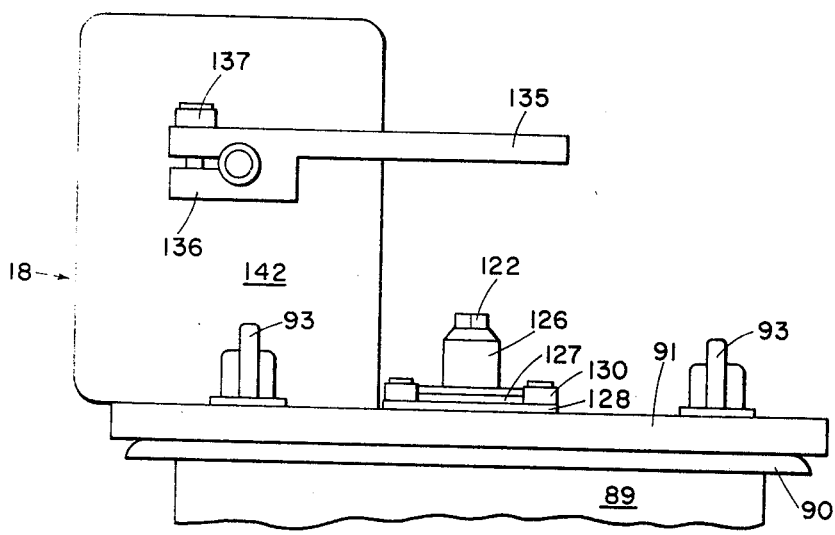
Fig. 3
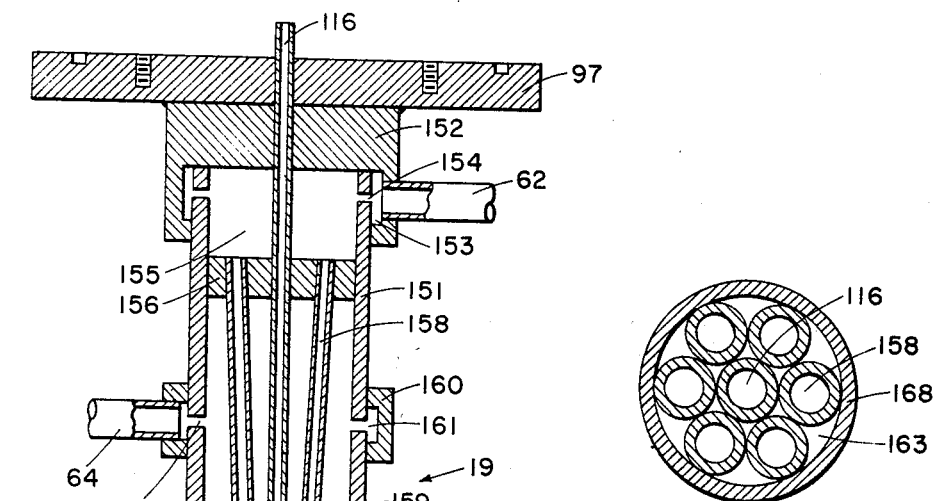
Fig. 4
Fig. 5
INVENTOR.
Joseph F. Wenckus
BY Paul R. Doherty
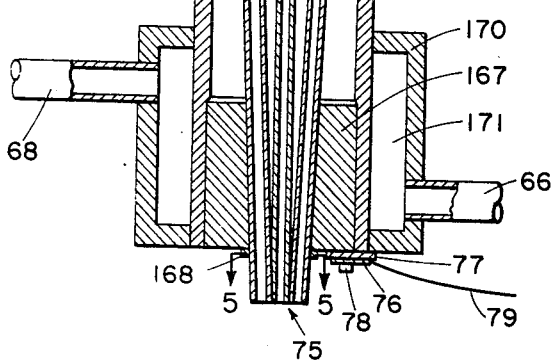
Attorney 3,511,614
HEAT SENSITIVE FUEL CONTROLLED
VERNEUIL PROCESS
Joseph F. Wenckus, Needham, and Paul R. Doherty, Woburn, Mass., assignors to Arthur D. Little, Inc., Cambridge, Mass., a corporation of Massachusetts
Filed June 16, 1967, Ser. No. 646,523
Int. Cl. B01j 17/24
U.S. Cl. 23—273                                    11 Claims

ABSTRACT OF THE DISCLOSURE

An improved apparatus for growing crystals by the Verneuil process. The apparatus comprises a powder feeding mechanism, a torch and a crystal support which is movable in both vertical and rotational directions. The operation may be entirely automated and has incorporated therein a flame sensor which interlocks the gas supply valves; and in the event the flame of the torch is not ignited after a set time the entire mechanism will automatically shut down.

---

In recent years, extensive optical research and such technological developments as lasers have indicated the need for the ability to grow synthetically many different kinds of crystals. There is also a need for continuing research in the synthetic production of crystalline materials heretofore unknown or only available naturally. Synthetic crystals are now being grown by a number of different methods from the basic component materials supplied either in finely divided powder form or as molten pools. The apparatus of this invention is applicable to the growing of crystals by the so-called flame fusion process which uses a finely divided powder as the starting material.

The flame fusion process of crystal growth was developed by A. Verneuil at the turn of the century to synthesize ruby and sapphire crystals. This process permits the growth of crystals of substances with high melting points (up to about 2300° C.) and particularly those materials which would react with known crucible materials. Relatively fast growth rates may be attained and large crystals are often obtained.

Basically, the process consists of feeding finely divided powder through a high temperature zone, typically the flame of an oxy-hydrogen torch, where it melts and falls onto a pedestal forming a sintered cone. The tip of the cone melts as it builds and crystallites form; the crystallite oriented in the most favorable growth direction predominates and forms the seed for the resultant crystal (a seed crystal of a desired orientation may be attached to the pedestal as an alternate method). Powder subsequently added melts in the flame and falls on the molten cap of the crystal. As the pedestal is lowered, a crystalline boule is formed.

A wide variety of single crystals have been grown successfully by the flame fusion technique including ruby, sapphire, spinel, rutile, scheelite, and mullite as well as numerous ferrites, silicates and garnets.

In view of the advantages associated with the Verneuil method of crystal growing it would be desirable to have available a flame fusion furnace which can be operated by a skilled technician, and which can function over a wide range of conditions rapidly to produce a large number of different crystals either for experimental purposes or for commercial applications.

It is therefore a primary object of this invention to provide an apparatus capable of growing crystals by the Verneuil method, the apparatus being a flame fusion furnace which is reliable in operation, capable of performing over a relatively wide range of operational conditions and of handling a wide variety of materials. It is another primary object of this invention to provide an apparatus of the character described which may be fully automated and which has means for controlling the operation of the torch such that it is not possible to experience an accumulation of a large volume of an explosive fuel mixture as the result of a flame-out or ignition delay in the torch. It is another object of this invention to provide a versatile flame fusion furnace especially suited for research work. Other objects of the invention will in part be obvious and will in part be apparent hereinafter.

The invention accordingly comprises features of construction, combination of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which FIG. 1 is a side elevational view, partly in cross section, of the flame fusion furnace of this invention;

FIG. 3 is a side elevational view of the upper portion of the powder feeding mechanism of FIG. 2;

FIG. 4 is a longitudinal cross section of the torch of the flame fusion furnace;

FIG. 5 is a cross section of the bottom end of the torch along line 5—5 of FIG. 4;

The essential parts of the crystal growing apparatus of this invention are the powder feed mechanism, the torch, which has a ceramic muffle defining a growth cavity and a pulling rod mechanism for rotating and moving the growing crystal. The integrated feeding mechanism, the torch assembly and the muffle are fastened to a rigid vertical column extending from a heavy base plate. The pulling rod mechanism and control console are fastened directly to the base plate. Vertical alignment of the furnace is critical to the operation so that three adjustable feet are provided for leveling the furnace assembly. The electrical controls, motors and pulling rod mechanism are totally enclosed so that they will not be affected by stray feed powder. The fluid feed components are coordinated and their operation is controlled by a thermal relay switch.

Figure 1:
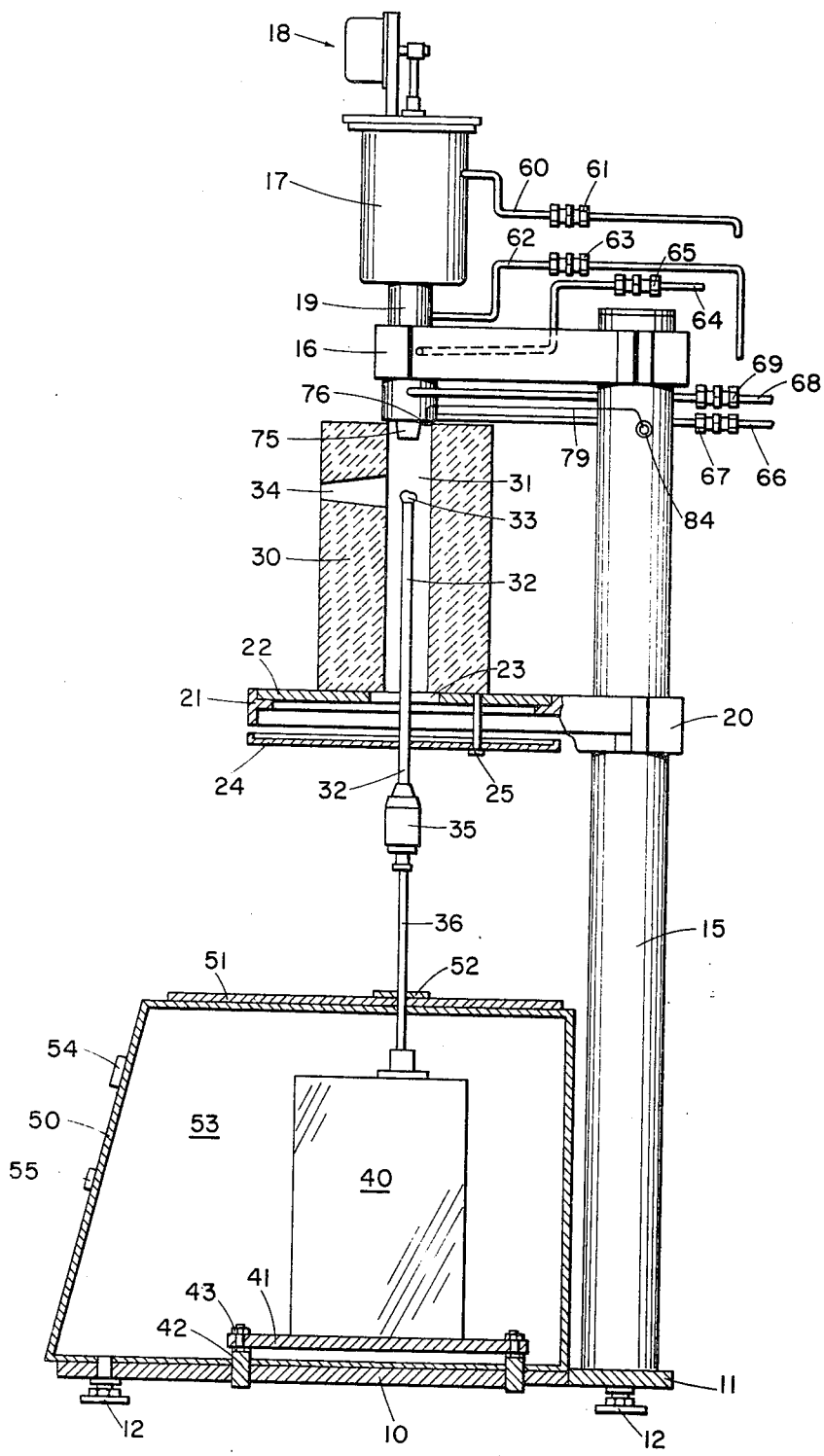

FIG. 1 is a side elevational view of the fusion furnace of the invention showing in cross section those portions of the furnace which are not further illustrated in greater detail. Inasmuch as alignment of the components is a necessity, the flame fusion furnace rests upon an adjustable base plate 10 which has, on one side, a centrally positioned extension base plate 11. Three elevator bolts 12 (two of which are shown) make possible the alignment of the base plate 10 and central extension base plate 11. Two of these bolts are associated with the base plate and one with the central extension plate. A heavy support column 15, resting on central extension base plate 11, extends vertically to provide the necessary supporting means for all of the components except the pulling head mechanism and control cabinet.

The support column 15 has an upper horizontal support arm 16 which holds the powder feeding mechanism 17 along with its auxiliary equipment 18, and the torch 19. The central horizontal support arm 20 is seen to be formed of an annular, lipped ring 21 supporting a circular plate 22 having a central passage 23. Under this supporting means is positioned a drip plate 24 designed to catch any powder and condensed water vapor which may fall in the process of crystal growth. The drip plate 24 is attached to the circular plate 22 through means of three shoulder screws 25 (only one of which is shown).

Inasmuch as extremely high temperatures are encountered there is provided between the bottom portion of the torch 19 and the support plate 22 a relatively heavy protective ceramic housing 30 which defines within it a cavity 31 in which the actual crystal growing process takes place. A crystal support rod 32 extends up into cavity 31 and it contains the crystal boule 33 which is positioned slightly below the hottest part of the torch flame. The ceramic housing 30 has a viewing port 34 cut into it so that the operator may visually observe the growth of the crystal. The crystal support rod 32 is attached through means of a chuck 35 to the pulling head rod 36. The pulling head mechanism 40 (seen in detail in FIGS. 6–8) rests upon a pulling head adjustable support plate 41 mounted on the adjustable base plate 10 through means of mounting pins 42 and screws 43. The pulling head mechanism 40 is in turn enclosed within a main central housing 50 which has a cover plate 51 and a wiper plate 52. The volume 53 within the housing 50 contains wiring, etc., and is equipped on its front face with control knobs such as shown for example at 54 and 55.

FIG. 1 shows the fluid lines connected to the furnace. An oxygen line 60, having a suitable coupling and sealing mechanism 61, leads into the powder feeding mechanism 17. Likewise, a hydrogen line 62, with coupling and seal 63, communicates with the interior of the torch as will be seen in detail in FIG. 4. An auxiliary oxygen line 64, with coupling and seal 65, leads into the central portion of the torch as will be seen in detail in FIG. 4. The bottom end of the torch is cooled and for this purpose cooling water is led in through inlet line 66, with coupling and seal 67, and withdrawn through outlet conduit 68, with coupling and seal 69.

The end of the torch 75 is shown somewhat diagrammatically in FIG. 1, and adjacent to it will be seen a thermocouple junction 76 having a lead wire 79 extending through a port 84 in the support column 15. The purpose of the thermocouple junction will be discussed in detail in connection with FIGS. 4 and 9.

The purpose of the powder feed hopper is to provide to the torch a controlled amount of the finely divided powdered material which is to be melted and crystallized to form the crystal. In the flame fusion furnace of this invention this is done by periodically striking a powder container to cause a controlled amount of the powder to sift through a screen and enter into the torch. The mechanism by which this is done is shown in detail in FIGS. 2 and 3, the former being a cross sectional longitudinal view and the latter being a side elevational view of the top portion of the powder feed mechanism.

The powder feeding mechanism 17 is seen to be formed of an outer casing 89, which at the upper end terminates in a rounded lip edge 90 which is contacted with a cover member 91 through a cover gasket 92 by means of wing bolts 93 which are screwed into threaded nuts 94 welded to the inner wall of the outer casing 89. Seals 95 are provided between the bolts and the top of cover 91. The wing bolts permit the cover 91, through gasket 92, to make an essentially fluid-tight seal with rounded lip edge 90 of the outer casing and hence defines an essentially fluid-tight volume 105 in outer casing 89. At the bottom of the feeding mechanism a support 97 is affixed to the bottom of casing 89 through an O-ring seal 98 by means of screws 99 which also have O-rings 100. This construction provides a rigid support for the outer casing 89.

The powder 106 which is to be fed to the torch is contained within an inner powder cannister 107 which is located within volume 105, and mounted for vibratory movement. The inner powder cannister 107 terminates in a funnel 108 which is attached thereto through wing nuts 109. The attachment of the funnel piece 108 is such as to hold a screen 110 (or other suitable foraminous member) in position to confine the powder within the inner cannister 107. Imparting a vibrating motion to the inner cannister 107, by the mechanism to be described, causes a predetermined and controlled amount of powder to pass through the screen 110 to enter the torch. The funnel 108 communicates with a funnel passage 113 machined in a solid transition piece 112. There is, however, no physical contact between the end of the funnel 108 and the funnel opening 113 of the solid transition piece. The funnel shaped passage 113 of this piece communicates with a central cylindrical passage 114 which in turn is in communication with the inner tubing 116 of torch 19 as will be described in detail with reference to FIG. 4.

In order to introduce a controlled amount of the powder periodically into the torch it is necessary to impart to the inner cannister a periodic vibratory motion and this is accomplished through the shaking mechanism which is generally indicated by the numeral 120. It includes an elongated screw 121 which extends into volume 105 and terminates externally in a nut 122 which serves as an anvil. The other end of the screw 121 has a cap 123 which affixes the inner cannister 107, through its top and through a spacer 124, to the elongated screw 121. In order to impart to the inner cannister the necessary periodic vibratory motion the screw 121 is mounted in the cover 21 through a rubber shock mount 126 which terminates around its periphery in a grooved lip 127 adapted to be held on the cover member 91 through means of a flange 128. The flange in turn is held in place by means of suitable screws 130 (see FIG. 3).

Figure 2:
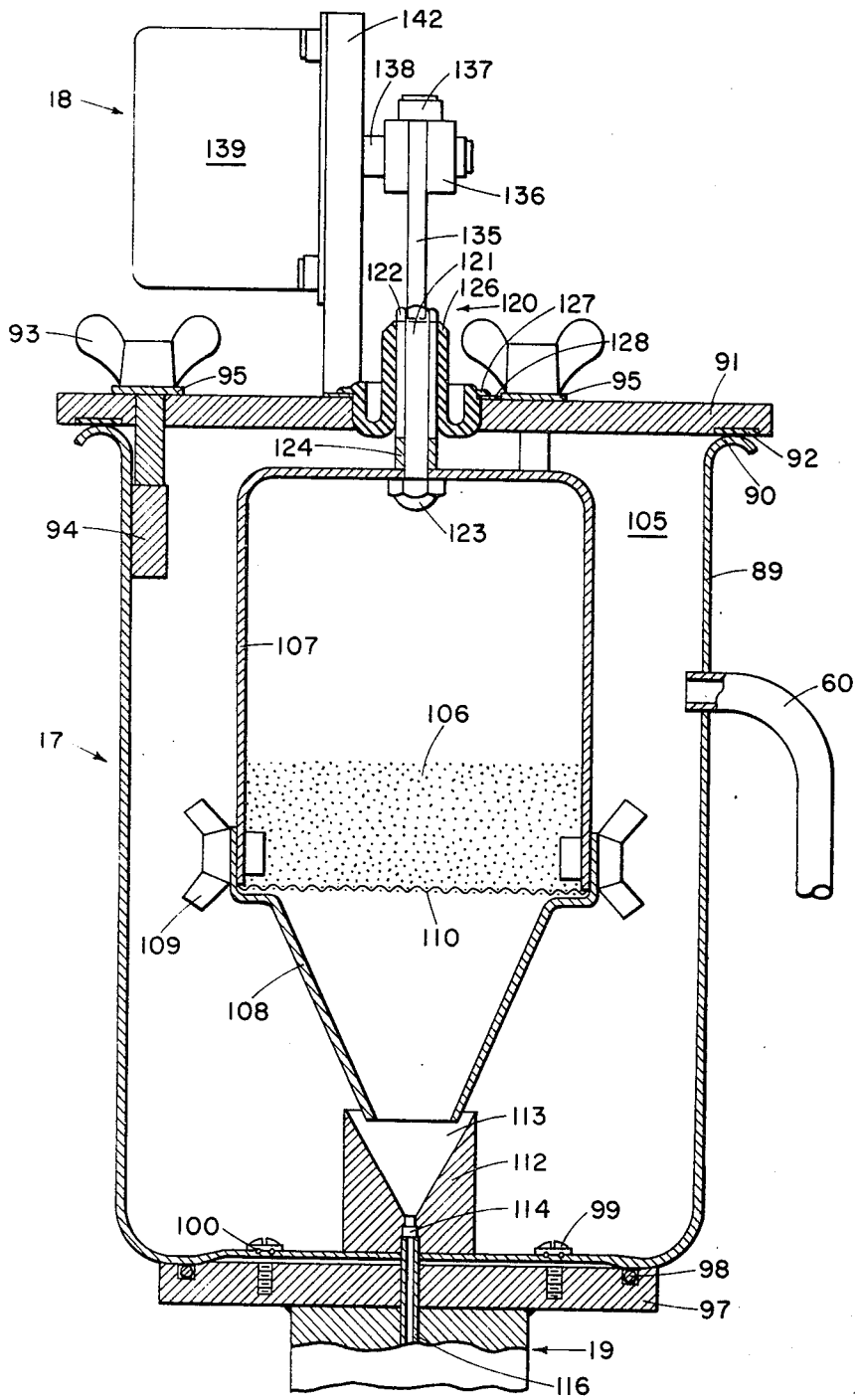
FIG. 2 is a longitudinal cross sectional detail of the powder feeding mechanism.

Motion is imparted to the inner cannister containing the powder by means of a nonsparking hammer 135 which is rotatably mounted on a hammer mount 136 and held in position by screw 137 (FIGS. 2 and 3). The hammer mount 136 in turn is positioned on the shaft 138 of a rotating solenoid 139. The rotating solenoid 139 is fixed in position above the cover of the powder feeding mechanism by means of a support plate 142.

When the rotary solenoid 139 is energized the hammer 135 strikes the anvil 122 and thus, through screw 121, imparts motion to the inner cannister 107 mounted in the flexible shock mounting 126. In this manner the inner cannister 107 is vibrated. A fixed amount of the finely powdered feed material 106 is discharged through the screen 110 and is funneled into the center tube of the torch along with a steady flowing stream of oxygen. The amount of powder falling depends upon the frequency and the intensity of the blow with which the hammer strikes the anvil and upon the mesh size of the screen. The frequency and intensity of the hammer blows may be adjusted and the powder feed rates may be varied with a high degree of reproducibility. Generally, the screens will be within the range of from about 60 to 100-mesh, but the choice of the size of the passages defined by the screen will vary depending upon the particle size of the powder and the amount of powder which it is desired to introduce into the torch at any one time.

Oxygen is introduced in through line 60 into the volume 105 of the outer casing of the powder feeding mechanism and is mixed with the powder as it enters into the funnel-shaped passage 113 of the transition block 112. Thus, the oxygen is thoroughly mixed with the powder as it enters into the tube 116 communicating with the torch.

Although the apparatus shown in FIGS. 1, 2, and 3 has been found to be particularly well suited for delivering an accurately controlled amount of powder to the torch at periodic intervals, any other system which is capable of supplying a desired quantity of powder to the torch may be used.

The torch is shown in cross sectional detail in FIGS. 4 and 5. It is of the multiple-tube type and essentially that described in U.S. Pat. 3,224,840. This torch assembly provides improved gas mixing and focusing of the flame, thereby providing greater energy input per unit area of the molten surface of the crystalline material being formed, and increasing the temperatures obtainable during growth. The temperature gradients existing across the diameter of the flame are reduced, thus minimizing the formation of internal stresses and strains in the resultant boule. However, the single crystals produced must still be annealed prior to any fabrication operation.

The torch is formed of an outer tubular housing 151 having a solid top cap 152 which is welded to the support plate of the powder feeding mechanism and through which the central inner tubing 116 of the torch passes. As explained in connection with the description of FIGS. 2 and 3 this central tubing 116 carries the powder along with the oxygen into the torch and hence into the melting zone where the oxygen and hydrogen meet to burn and develop the necessary heat to melt the powder. The top cap 152 defines a manifold 153 which is in fluid communication with line 62 bringing the hydrogen into the torch. The manifold 153 in turn is in fluid communication by means of passages 154 with a fluid plenum chamber 155 into which six inclined equidistanced hydrogen tubes 158 open. These tubes pass down through the chamber 159 defined by tubular housing 151, and at the bottom end 75 meet as indicated in the cross section in FIG. 5. A centrally positioned manifold housing 160 defines a manifold 161 around the tubular housing 151 and by way of passages 162 provides fluid communication between the auxiliary oxygen supply line 64 and the chamber 159.

The outer tubular housing 151 is closed at the bottom end by means of a lower support block 167 in which the tubings 116 and 158 are mounted and held in place through an external ring 168. Around the bottom of the torch is a cooling chamber housing 170 defining a cooling chamber 171 into which water is introduced through line 66 and withdrawn through line 68.

As will be seen in FIG. 5 there exists fluid passages 163 which are defined by the outer walls of the six hydrogen lines 158 and the central powder line 116 and the inner wall of the passage through lower support block 167. The oxygen introduced into the volume 159 passes through these spaces 163 to be mixed with the hydrogen as it is ejected from the bottom end of the tubes 158. In addition, there is of course oxygen in the central tubing 116. As the streams converge and burn they form a focus area of heat of sufficient intensity to melt the powder.

At the bottom of the torch is affixed a temperature sensing means which is designed to determine whether or not the hydrogen and oxygen issuing from the torch has ignited. This temperature sensing mechanism comprises a metal heat conducting plate 77 (such as a stainless steel foil) which is affixed to the bottom water-cooled surface of the torch through a screw 78 and to which is affixed a wire 79 of a dissimilar metal (e.g., platinum) to form a thermocouple junction 76 and become lead 79. The metal torch and connecting tubing provide the other electrical connection to the junction. As will be explained below in connection with the description of FIG. 9 this temperature sensor at the base of the torch is interlocked with the gas supply valves; and in the event the flame is not ignited within a fixed time (e.g., 45 seconds) after gas flow has started, or in the event there is a flameout, the gas flow will be automatically shut off. Thus if the thermocouple is not brought up to temperature within the specified time, the remaining mechanism of the flame fusion furnace is not activated. This in turn prevents any escape of hydrogen or oxygen into the remaining portion of the system or into the atmosphere surrounding it. It also prevents the unnecessary discharge of powder onto the drip plate.

For most materials which have relatively high melting points, the oxy-hydrogen torch as shown in FIG. 4, or in any other suitable configuration, which can concentrate the heat at essentially a focal point or small area is preferred. However, any other system capable of developing the required temperature and of delivering the powder in a molten condition onto the crystal support and then onto the growing crystal may be used.

The purpose of the pulling head is to impart both translational and rotational motion to the crystal support rod 32 through means of pulling rod 36 (FIG. 1). It is necessary that the movement in these axial and rotational motions be accomplished at continuous and even speeds in order to build up a satisfactory crystal on the support. The pulling head mechanism of this invention provides the necessary translational and rotational motion and permits a selection of speeds. The pulling rod is driven vertically by a variable speed DC motor through two fine-pitch lead screws mechanically interlocked by a timing belt. A mechanical releasing coupling permits rapid manual positioning of the shaft as well as serving to protect the gear train components when the limits of travel have been reached. The synchronous motor for rotation is easily interchangeable with the others of different speeds so that a selection of rotational rates ranging from fractional to tens of r.p.m. may be obtained. Alignment of the shaft may be readily maintained by precision machining of the housing, and the critical angular position of the housing may be adjusted to coincide with the axis of the protective ceramic housing and torch assembly.

Figure 6:
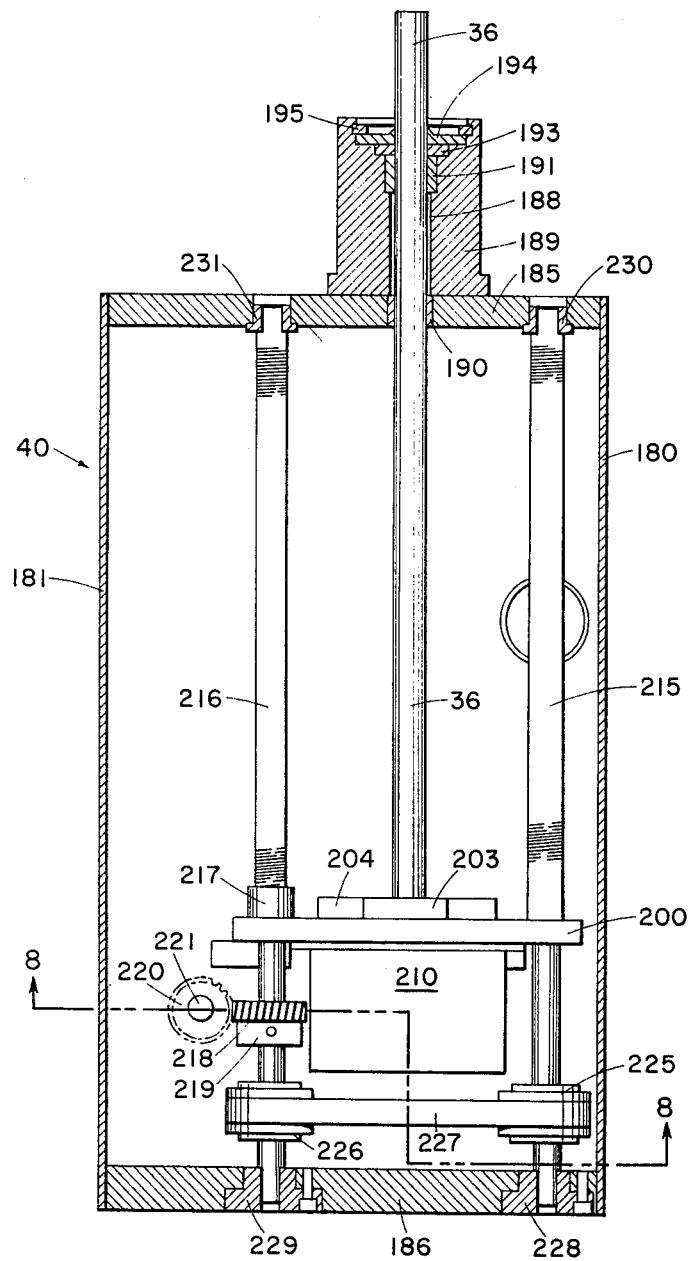
FIG. 6 is a longitudinal cross sectional view of the pulling head of the flame fusion furnace of this invention.
Figure 7:
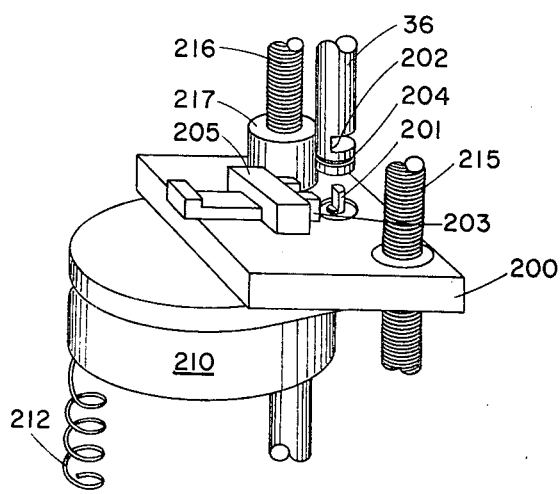
FIG. 7 is a perspective view of a portion of the pulling head of this invention showing the rotating means and the attachment of the pulling rod.
Figure 8:
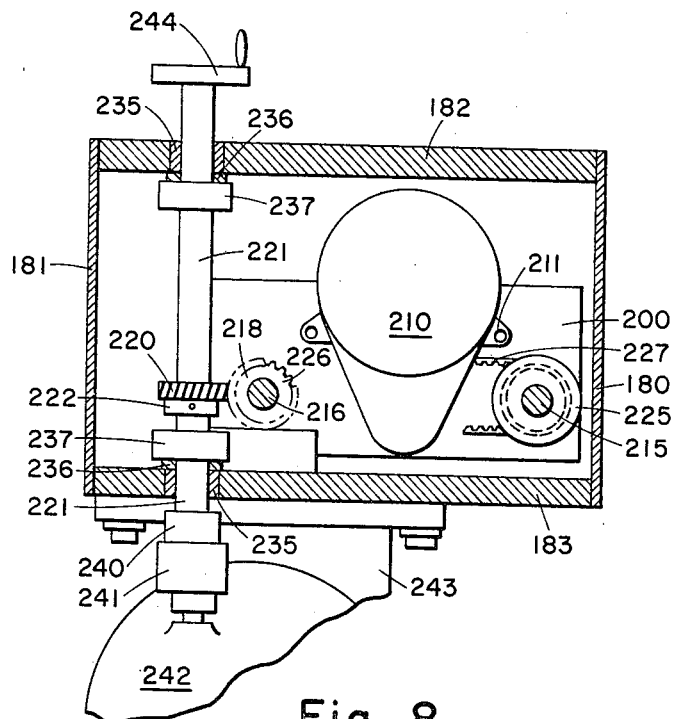
FIG. 8 is a cross section of the pulling head along line 8—8 of FIG. 6.

The pulling head mechanism of this invention is shown in detail in FIGS. 6, 7 and 8. It is encased in a housing which is shown in FIGS. 6 and 8 to be comprised of side plates 180 and 181, end walls 182 and 183, a top plate 185 and a bottom plate 186. Conveniently the heavier end walls and top and bottom plates may be formed as a continuously cast housing and the thinner side plates attached thereto. The pulling rod 36 enters the housing through a central passage 188 of a bearing housing 189. It is maintained in alignment through bushings 190 and 191 and protected by means of a felt wiper ring 193, and a wiper plate 194, which is maintained in position through a retaining ring 195.

As will be seen in FIG. 6, and in greater detail in FIG. 7, the pulling rod 36 terminates at the motor plate 200 which on its underside supports the motor 210 and provides clearance for the motor shaft 201 to engage the pulling rod 36 which is attached in rotatable relationship to the topside of motor plate 200. The attachment of rod 36 to motor shaft 201 is made through flat 202 in rod 36 which engages motor shaft 201 and the rod is locked to the motor plate 200 by a sliding key 203 engaging groove 204 in shaft 36. The sliding key 203 is backed off in retaining member 205 to disengage shaft 36. The synchronous motor 210 is bolted by means of bolts 211 to the underside of the motor plate (FIG. 8) and is equipped with a flexible cord 212 so that it may be moved up and down within the pulling head housing.

The motor plate 200, and hence the pulling rod 36, is moved vertically on two lead screw shafts 215 and 216, the latter turning in an extended bushing 217 that functions as a stop collar to limit the upward motion (FIG. 6). This vertical motion is accomplished through a helical driven gear 218 held onto the lower portion of the shaft 216 by means of a collar 219. The helical gear 218 engages a driving helical gear 220 mounted on a shaft 221 which (as will be seen in FIG. 8) is essentially an extension of the shaft of a motor, the mounting of which is accomplished through a collar 222. Affixed to the bottom ends of the lead screws 215 and 216 are two sprockets 225 and 226 which engage a timing belt 227. The two lead screw shafts rotate in shaft bearings 228 and 229 positioned in the bottom plate 186 and in the flanged bearings 230 and 231 located in the top plate 185. The shaft 221 rotates in bearings 235, in thrust bearings 236 and shaft collars 237, located within the pulling head housing, and in the bearing 240. Coupling to the motor is accomplished through a manually releasable clutch-coupling 241 and the motor 242 is supported on the external walls of the housing through a suitable support such as 243. Shaft 221 terminates in a manually operable turning wheel 244 which permits manual adjustment of the motor support plate and rod. The arrangement is such that this manual operation cannot harm the driving components if wheel 244 is turned after the motor 210 reaches its lowermost position.

Although the pulling head illustrated herein in detail provides a rugged, reliable component, any other mechanism capable of imparting a combination of vertical and rotational motion to the pulling rod may be used.

Figure 9:
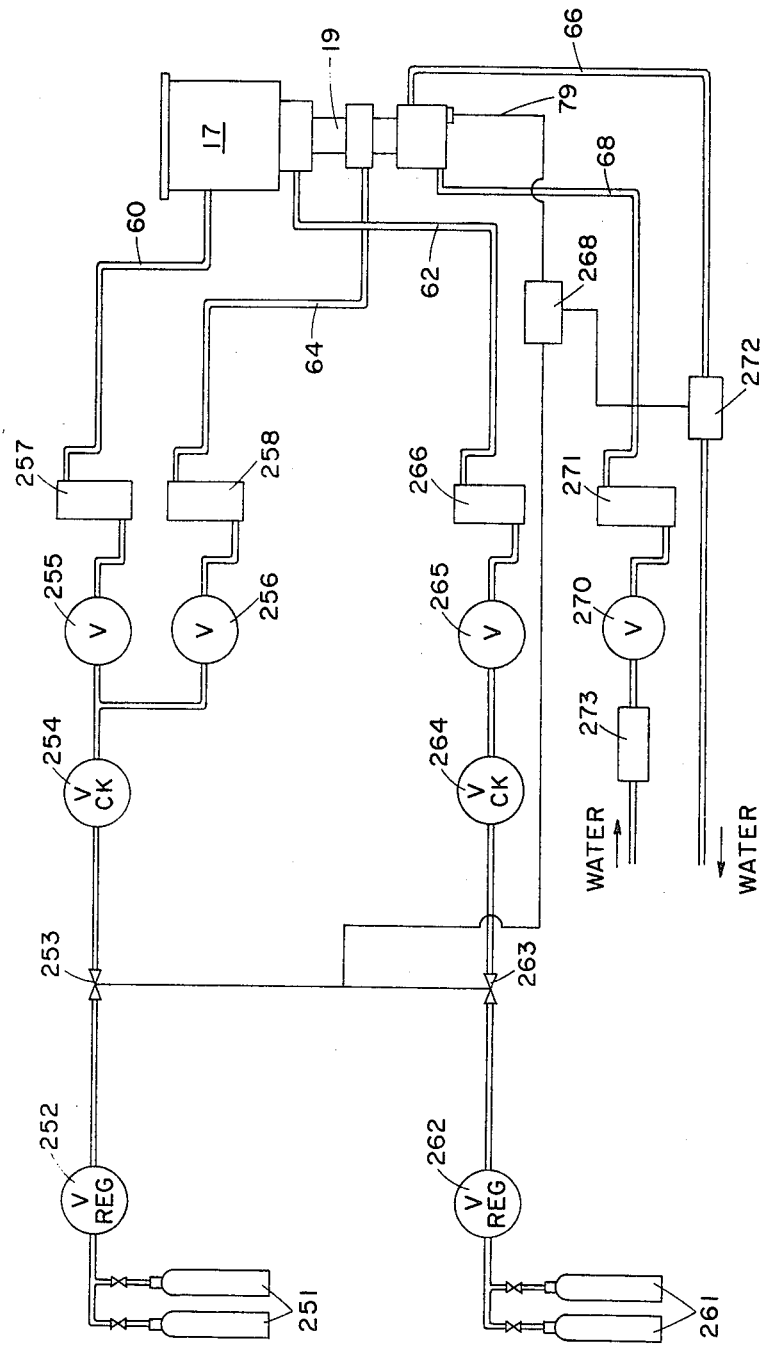
FIG. 9 is a diagram showing the fluid flow lines into the powder feeding mechanism and the torch and the means by which their operation is controlled.

FIG. 9 is a diagrammatic representation of the flow of fluids within the flame fusion furnace system and it illustrates the operation of the safety cut-off mechanism. Oxygen gas is furnished from a suitable supply source such as alternate oxygen tanks 251. The oxygen then passes through a regulating valve 252 and is controlled by solenoid shut-off valve 253. It then passes through a check valve 254 and branches out to enter lines 60 and 64, passing through valves 255 or 256 and flow meters 257 or 258.

The hydrogen gas is furnished from a suitable source of supply such as alternate tanks 261. It then passes by way of a regulating valve 262, controlled by a solenoid shut-off valve 263, through check valve 264, control valve 265 and a flow meter 266 to enter the torch through line 62. It will be seen that the thermocouple junction placed at the hot end of the torch 19 is electrically connected to a thermal relay switch 268 which in turn is connected to the solenoid shut-off valves 253 and 263 associated with the control of oxygen and hydrogen flow. The solenoid valves 253 and 263 are by-passed for a preset length of time (e.g., 45 seconds). If the thermal relay switch is not activated within this preset length of time because no heat is put into the thermocouple junction, then the bypass closes the solenoid valves 253 and 263 and the supplies of the oxygen and hydrogen are cut off. Thus if the hydrogen and oxygen do not burn within a set time all gas flow is cut off; and the accumulation of large volumes of these gases into the furnaces and subsequently into the atmosphere is thereby prevented.

The water for cooling the torch is brought in from a suitable supply through a filter 273, a valve 270 and a flow meter 271 and subsequent to its passage within cooling chamber 171 of the torch (FIG. 4), it is withdrawn through line 66 by way of a flow switch interlock valve 272 to be discharged in any suitable manner.

In the operation of the flame fusion furnace of this invention the pulling rod 36 is adjusted to bring the crystal support 32 into a position just slightly below the hottest spot in the torch flame. The pulling rod 36 is then engaged so that it may be turned by the synchronous motor 210 and moved vertically through attachment to motor plate 200 (FIG. 7). A secondary safeguard is incorporated into the apparatus in that a sufficient flow of water into the torch and out by way of conduit 66 is required to actuate interlock 272 (FIG. 9) before there can be any other fluid flow through the apparatus. Thus the first step in actual operation is to turn on the water supply valve 270. The rotating solenoid 139 which drives the hammer in the powder discharge mechanism, the motor 242 which drives the helical gear assembly for moving the pulling rod 36 and the synchronous motor 210 are then all started and the valves 253 and 263 are bypassed to supply the oxygen and hydrogen to the torch. If, however, within 45 seconds (or other set period) the torch has not been ignited as indicated at the thermocouple junction 76 the solenoid bypass closes and the fluid flow is stopped. If, however, the thermal relay actuates the solenoid valves (which means that the oxygen and hydrogen are burning to form the necessary heat) then the furnace continues operation. The speed at which the pulling rod is moved downwardly will depend upon the amount of powder which is being delivered and the type of crystal which it is desired to grow.

It will be seen that the manner in which the performance of the furnace may be regulated is extremely versatile permitting the growth of any number of different crystals in the furnace. As an example of the operation of the furnace, the following may be given. Oxygen and hydrogen are delivered to the torch at pressures of about 40 p.s.i. and at gas flow rates of about 15 litres per minute of hydrogen and slightly less of oxygen. This will supply sufficient heat to melt aluminum oxide powder in growing sapphire or rubies. Cooling water is allowed to flow through the torch at a rate of about one-half gallon per minute and the vertical motion of the pulling rod 36 is maintained at about one inch per hour while the rotational speed is 10 r.p.m. The rotary solenoid operates fifty times per minute delivering approximately 0.005 to 0.01 gram of material to the growing crystal at each delivery period.

It will be seen from the above description that the flame fusion furnace of this invention is versatile in its operation. It may be constructed in a compact configuration and wholly automated. Moreover, means are incorporated for automatically shutting off the flow of oxygen and hydrogen should the torch not function properly. This permits the furnace to be operated by a skilled technician and to achieve a degree of safety heretofore not possible.

It will be seen that the objects set forth above, among those made apparent from the preceding description, are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of langauge, might be said to fall therebetween.

We claim:
1. An apparatus for growing synthetic crystals using a finely divided powder, comprising in combination
 (a) torch means adapted to provide within a focus area a source of heat of an intensity sufficient to melt the finely divided powder to be crystallized;
 (b) powder feeding means arranged in conjunction with said torch means to deliver said finely divided powder in controlled quantities through said focus area;
 (c) crystal support means adapted continuously to maintain the growing crystal slightly below said focus area;
 (d) fuel delivery means incorporating valve means for supplying to said torch means a fuel mixture for combustion to provide said heat;
 (e) heat sensing means associated with the discharge end of said torch means; and
 (f) delayed action, thermally controlled switch means responsive to said heat sensing means and providing a connection between it and said valve means of said fuel delivery means, said switch means being adapted to close said valve means in the absence of said combustion after a predetermined period of time.

2. An apparatus in accordance with claim 1 wherein said powder feeding means comprises in combination
(a) an essentially fluid-tight outer casing;
(b) powder conduit means communicating with the powder channel of said torch means;
(c) a powder containing cannister, the bottom of which is a foraminous member, mounted within said outer casing and adapted for vibratory motion whereby a controlled amount of said powder is discharged into said powder conduit means when said cannister is vibrated; and
(d) means for imparting said vibratory motion to said cannister.

3. An apparatus in accordance with claim 1 wherein said crystal support means is a rod having associated therewith means to impart vertical and rotational motions thereto.

4. An apparatus in accordance with claim 1 wherein said heat sensing means comprises a thermocouple affixed to the bottom of said torch means in heat exchange relationship therewith.

5. A flame fusion furnace for growing synthetic crystals; comprising in combination
(a) a torch adapted to burn a combustible fuel mixture of fluids thereby to provide within a focus area a source of heat of an intensity sufficient to melt the finely divided powder to be crystallized, said torch having a central powder channel surrounded by a plurality of fluid channels;
(b) powder feeding means arranged periodically to deliver to said central powder channel of said torch a predetermined amount of said powder along with one of said fluid fuel components;
(c) crystal support means;
(d) means to impart vertical and rotational motions to said crystal support means;
(e) fuel delivery means incorporating valve means for supplying said one fluid fuel component to said powder feeding means and the other of said fluid fuel component to said plurality of fluid channels of said torch;
(f) heat sensing means associated with the discharge end of said torch; and
(g) delayed action, thermally controlled switch means responsive to said heat sensing means and providing a connection between it and said valve means of said fuel delivery means, said switch means being adapted to close said valve means in the absence of the combustion of said fuel mixture after a predetermined period of time.

6. A furnace in accordance with claim 5 further characterized by having a protective ceramic housing surrounding the discharge end of said torch and defining a cavity wherein said focus area is located and into which said crystal support means extends.

7. A furnace in accordance with claim 6 further characterized by having means positioned under said ceramic housing to collect water and powder which is not melted for inclusion in said crystal.

8. A furnace in accordance with claim 6 further characterized by having adjustable base plate means supporting a columnar shaft, said base plate supporting said means to impart said vertical and rotational motion to said crystal support means, and said columnar shaft supporting said torch, powder feeding means and said ceramic housing.

9. A furnace in accordance with claim 5 wherein said powder feeding means comprises, in combination
(a) an essentially fluid-tight outer casing;
(b) powder conduit means communicating with said central powder channel of said torch;
(c) a powder containing cannister having a screen bottom being located within said casing and being mounted to said casing through mounting means responsive to an externally applied force whereby a predetermined quantity of said powder is discharged through said screen into said powder conduit means when said force is applied; and
(d) means for applying said force to said mounting means.

10. A furnace in accordance with claim 9 wherein said mounting means comprises a central metal member within an elastomeric shock mounting member and said means for applying said force comprises periodically actuatable hammer means arranged to engage said central metal member.

11. A furnace in accordance with claim 5 wherein said means to impart vertical and rotational motions to said crystal support means comprises, in combination
(a) rotatable parallel lead screw shafts;
(b) a movable support plate having threaded openings through which said shafts pass and with which they are engaged for translational movement with the rotation of said lead screw shafts;
(c) means for rotating said shafts thereby to impart vertical motion to said support plate;
(d) a pulling rod rotatably mounted on said support plate; and
(e) means for rotating said pulling rod.

References Cited

UNITED STATES PATENTS

| | | | |
|---|---|---|---|
| 2,156,235 | 4/1939 | Betz et al. | 431—80 |
| 2,591,561 | 4/1952 | Lester et al. | 23—273 |
| 2,697,308 | 12/1954 | Dauncey et al. | 23—273 |

NORMAN YUDKOFF, Primary Examiner

R. T. FOSTER, Assistant Examiner

U.S. Cl. X.R.

236—15; 431—80